USO08768943B2

(12) United States Patent
Puttaswamy et al.

(10) Patent No.: US 8,768,943 B2
(45) Date of Patent: Jul. 1, 2014

(54) MULTI-SOURCE CONSUMER BEHAVIOR TRACKING SYSTEM

(75) Inventors: Hemanth Puttaswamy, Fremont, CA (US); Travis Woodruff, Roanoke, TX (US); Srinivasa Ogireddy, San Carlos, CA (US); Nipun Batra, Foster City, CA (US); Steve Howard, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 12/873,597

(22) Filed: Sep. 1, 2010

(65) Prior Publication Data

US 2012/0054213 A1  Mar. 1, 2012

(51) Int. Cl.
*G06F 17/30* (2006.01)

(52) U.S. Cl.
USPC .......................................................... 707/758

(58) Field of Classification Search
USPC ........ 707/758; 705/14.19, 14.49, 14.54, 14.5, 705/26.41, 35, 67
See application file for complete search history.

(56) References Cited

U.S. PATENT DOCUMENTS

| 7,533,064 | B1 * | 5/2009 | Boesch | 705/67 |
|---|---|---|---|---|
| 7,814,139 | B2 * | 10/2010 | Singh et al. | 709/201 |
| 8,060,398 | B2 * | 11/2011 | Canning et al. | 705/7.29 |
| 8,156,026 | B2 * | 4/2012 | Junger et al. | 705/35 |
| 8,301,510 | B2 * | 10/2012 | Boesch | 705/26.41 |
| 8,515,791 | B2 * | 8/2013 | Woda et al. | 705/7.11 |
| 2005/0288954 | A1 * | 12/2005 | McCarthy et al. | 705/1 |
| 2006/0235831 | A1 * | 10/2006 | Adinolfi et al. | 707/3 |
| 2006/0282359 | A1 * | 12/2006 | Nobili et al. | 705/35 |
| 2007/0192319 | A1 * | 8/2007 | Finley et al. | 707/7 |
| 2009/0018915 | A1 * | 1/2009 | Fisse | 705/14 |
| 2009/0119160 | A1 * | 5/2009 | Woda et al. | 705/10 |
| 2009/0119161 | A1 * | 5/2009 | Woda et al. | 705/10 |
| 2010/0106597 | A1 * | 4/2010 | Jayakody | 705/14.53 |
| 2010/0312706 | A1 * | 12/2010 | Combet et al. | 705/50 |
| 2010/0313009 | A1 * | 12/2010 | Combet et al. | 713/150 |
| 2011/0191209 | A1 * | 8/2011 | Gould et al. | 705/26.82 |
| 2011/0258049 | A1 * | 10/2011 | Ramer et al. | 705/14.66 |
| 2012/0209706 | A1 * | 8/2012 | Ramer et al. | 705/14.51 |

* cited by examiner

*Primary Examiner* — Jean M Corrielus
(74) *Attorney, Agent, or Firm* — Winstead, P.C.

(57) ABSTRACT

A process for tracking a consumer's behavior based on his or her entries into a number of cybernetic device sources such as personal computers, automated goods and services dispensing kiosks, automated teller machines and cell phones does not depend exclusively upon the presence of cookies implanted into such devices by vendors or upon a consumer's having provided a positive identification form. The process uses a pairing algorithm to comb elements of information from the source device visitation records in search of one or more common characteristics that can be presumptively attributed to a single consumer. Characteristics such as source device identifiers, phone numbers, street addresses or email addresses are each weighted by a weighting factor that is used to identify the consumer and attribute the visitation record and its associated activity to that consumer at a calculated confidence level. The attributed information can analyzed to track that consumer's behavior.

22 Claims, 6 Drawing Sheets

MULTI-SOURCE CONSUMER BEHAVIOR TRACKING SYSTEM

FIELD OF THE INVENTION

This invention relates to web analytics, and more specifically to the gathering of commercial behavioral information about a consumer from different and sometimes anonymous cybernetic sources.

BACKGROUND

Ordinarily, web analytics depends on cookie record identifiers placed by vendors in consumer devices and/or consumer registration information maintained by the vendor in order to track certain activities of a particular consumer across a plurality of interactive visits. Nowadays, if a consumer deletes the cookie in her computer, there may be no practical means to tie her next visit with an earlier one.

An individual may employ different devices from one time to another such as when she uses her home computer for a first visit then her employer's computer for a subsequent one. She may also visit the same vendor using a cell phone, a goods or services dispensing kiosk, or the vendor's brick and mortar store. The individual can use a credit card to make a purchase through one of these devices and use the same card at an automated teller machine (an ATM). Moreover, several individuals may use the same device loaded with a single successively updated cookie. Many catalog vendor sites do not admit cookies. A single vendor can be visited by a single consumer using a single device such as a mobile phone through different disintegrated channels such as the vendor's website supporting mobile phone access, and the vendor's telephonic support line.

Unless each consumer provides with every use of a device a clear identification such as a registration number, the analytic systems either miss a great deal of information about a particular consumer's activities, or combine information about unrelated persons.

There is a need for some identifying process or system that can track the behavior of a consumer over many visits using a variety of potentially disparate devices, through a variety of potentially disparate channels where the consumer does not provide a clear identification with each visit.

SUMMARY

The principal and secondary objects of the invention are to provide an improved system of tracking consumer behavior. These and other objects can be achieved by some of the present embodiments using a presumptive consumer identification that can be automatically refined then associated with a other consumer interactions originating from various cybernetic sources.

The content of the original claims is incorporated herein by reference as summarizing features in one or more exemplary embodiments.

In some embodiments there is provided a process for associating unattributed elements of information collected from a plurality of cybernetic sources with a plurality of consumers, said process comprising: creating a master registration containing at least one characteristic attributed to a first consumer; collecting a plurality of visitation records containing elements of information non-exclusively attributable to said first consumer; detecting in said elements a value matching a portion said at least one characteristic; said value originating in a first of said records; and, attributing said first of said records to said first consumer.

In some embodiments said records are collected through a plurality of disparate marketing channels.

In some embodiments the process further comprises assigning a record confidence level to said first of said records.

In some embodiments the process further comprises: each of said records comprising activity data related to a cybernetic visit; a plurality of said records being attributed to a plurality of master registrations; and, running an analysis of said activity data across said plurality of registrations and said plurality of records.

In some embodiments said running comprises selecting a minimum confidence level; and screening said plurality of said record confidence levels against said minimum confidence level.

In some embodiments the process further comprises assigning a master registration confidence level to said first master registration.

In some embodiments the process further comprises adjusting said master registration confidence level according to a record confidence level said first of said records attributed to said first master registration.

In some embodiments the process further comprises updating said record confidence level according to at least one weighting factor determined by the context in which said first of said records was created.

In some embodiments the process further comprises updating said record confidence level according to a number of matching elements found within said first of said records.

In some embodiments said updating comprises assigning an intrinsic confidence level to each of a plurality of element types common to said records.

In some embodiments the process further comprises changing said intrinsic confidence level according a context adjustment weighting factor.

In some embodiments the process further comprises linking said first master registration with a source identifier code associated with said first of said records.

In some embodiments the process further comprises subsequent detecting of a second value in a second of said records matching said source identifier code.

In some embodiments the process further comprises said portion of said characteristic being an entirety of said characteristic.

In some embodiments said value is of a first type and said at least one characteristic is of a second type, wherein said first and second types are different.

In some embodiments the process further comprises: flagging a number of elements associated with said value; determining whether said number pf elements has an associated confidence level which allows said value to be used as a future characteristic in said master registration; and, updating said master registration to have a new characteristic containing said value.

In some embodiments said first master registration remains un-associated with an identified one of said consumers.

In some embodiments the process further comprises assigning a weighting factor to said characteristic.

In some embodiments there is provided a process for associating anonymous strings of information collected from a plurality of cybernetic sources with identified consumers, said process comprising: detecting in said strings characteristic values non-exclusively attributable to a consumer; flagging strings containing a plurality of said characteristics;

combining a plurality of said flagged strings into batches as a function of similarities in said characteristics; and attributing each of said batches and related strings of information to a single one of said consumers as a function of information in said batches.

In some embodiments said attributing comprises using a pairing routine.

In some embodiments there is provided a process for associating strings of information collected from a plurality of cybernetic sources with a subject, said process comprising: extracting from each of said strings at least one characteristic non-exclusively attributable to a subject; combining a plurality of said strings into batches as a function of similarities in their respective characteristics; attributing each of said batches to a subject; and identifying said subject through information contained in said attributed batches.

In some embodiments said combining comprises scanning said strings to extract at least one common characteristic.

In some embodiments said scanning comprises using a pairing routine.

In some embodiments the process said extracting comprises assigning weighting factors to a plurality of said characteristics.

DESCRIPTION OF THE EXEMPLARY EMBODIMENTS

Figure 1:
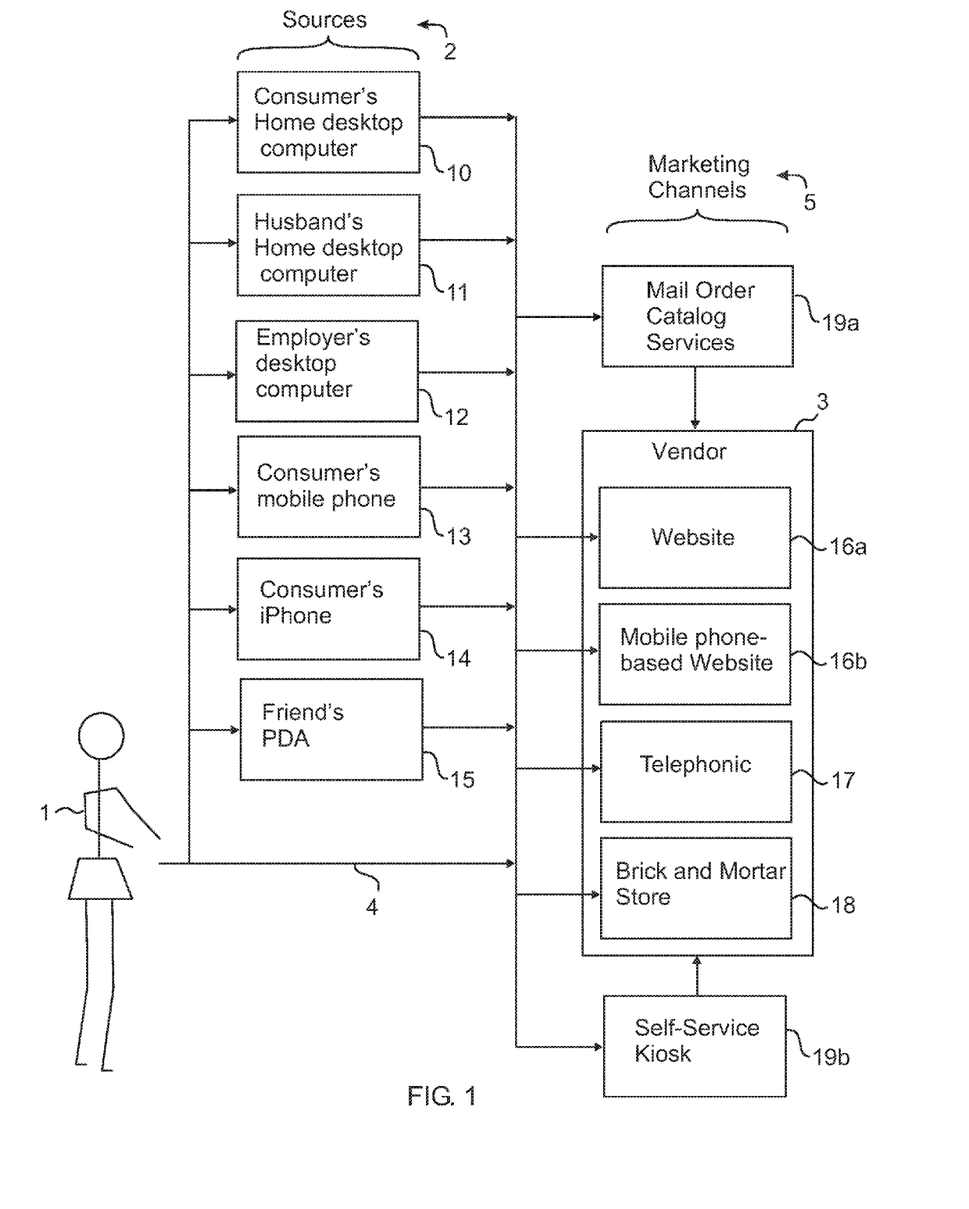
FIG. 1 is a block diagram indicating various exemplary channels in which a consumer visits a vendor.

Referring now to the drawing, there is shown in FIG. 1 a block diagram indicating that a subject 1, such as an individual consumer has a number of sources 2 through which she can conduct interactions or visits with a specific vendor 3. The interactive sources 2 accessible to the consumer can include her home personal desktop computer 10, her husband's desktop computer 11, her employer's desktop computer 12, her mobile phone 13, her iPhone device 14 (commercially available from Apple Corporation), or her friend's PDA (Personal Digital Assistant) 15. The consumer herself can act as a source 4 for in-person visits.

The visits can be conducted through a number of different channels 5 using source devices that are so equipped. Some channels are maintained by the vendor itself such as its standard html-based website 16a, its mobile-phone based website 16b, its voice telephonic system 17 which can be automated or use a human operator, and its brick an mortar stores 18. Other visits can be through channels maintained by contracted third parties such as mail order catalog services 19a, and self-service kiosks 19b, to name a few.

The channels are potentially disparate in that there may be no in-place, automated way of incorporating data received from one channel into data received by another channel. In other words, for example, the vendor may have no system in place for integrating in-store credit card purchase data with vendor website visitation data.

Figure 2:
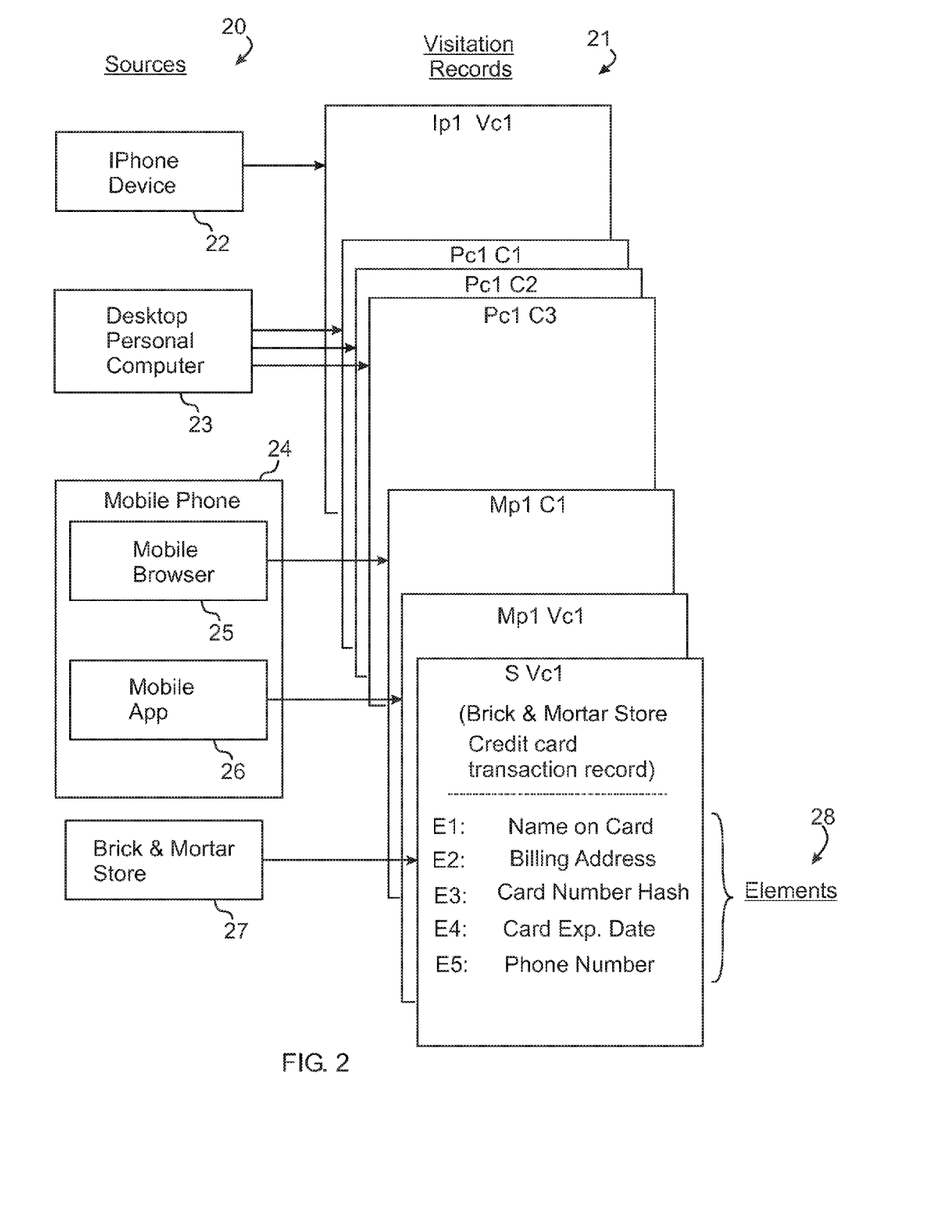
FIG. 2 is a block diagram indicating exemplary visitation records created using a variety of consumer source devices.

As shown in FIG. 2, each visit by a consumer using one of the above sources and one of the above channels can result in a record being created and stored either as a cookie on the consumer's source device such as the user's personal computer, or as a "virtual cookie" stored in some accessible database apart from, but in association with, the user's source device such as an iPhone network database. Each record, whether characterized as a cookie, "virtual cookie" or some other characterization ultimately contains elements of data which can help identify and indicate the activity of the consumer during one or more visits.

FIG. 2 further shows that a single consumer can conduct a plural number of visits to a single vendor from a plural number of sources 20 to create plural number of visitation records 21. For example, the consumer can conduct a visit through her iPhone device 22 to the vendor's website resulting in a iPhone virtual cookie record Ip1 Vc1. Through her desktop personal computer 23 she can make three separate visits resulting in three cookie records Pc1 C1, Pc1 C2 and Pc1 C3. Her mobile phone 24 can act as two sources, namely, a mobile browser 25 and a mobile app 26, through which visits can result in a cookie Mp1 C1 on her mobile phone, or a virtual cookie Mp1 Vc1 associated with her mobile phone respectively. A visit personally to the vendor's brick and mortar store 27 results in a virtual cookie S Vc1 visitation record in the form of a credit card transaction record.

Each visitation record contains data relating to the activity occurring during that particular visit. For example, the visitation record S Vc1 is a virtual cookie recording data relating to an in-store credit card transaction. This record can contain elements 28 such as the consumer's name E1, mailing address E2, Credit Card Number hash value E3, Credit Card Expiration Date E4, and Phone Number E5. Another cookie such as Pc1 C1 on the consumer's home desktop computer could include data relating to a credit card purchase on the vendor's website. Although not shown specifically in the drawing, that cookie could include data relating to the date and time of the transaction, the identification of the item purchased, it's purchase price, any promotional codes entered, a listing of the various webpages visited, and links relating to how that visit occurred such as through a link from an advertisement on an unrelated website, among other data.

Importantly, the data in each visitation record comprises potentially identifying informational elements which can serve to identify the consumer responsible for that record. Those potentially identifying informational elements can be categorized into a number of element types such as email addresses, phone numbers, mailing addresses, credit card number hash values, credit card expiration dates, membership ID numbers, personal names, ages, birth dates, or parts thereof and various other data in the form of strings, numbers, dates or other types of data sets.

Parts of the above described informational elements can be treated as informational elements in their own right. For example, although a zip code is part of a mailing address, it can be treated as a separate informational element by itself. Similarly, email starting strings, e.g. the "abe" from the email address "abe@whitehouse.gov" can be treated as a separate informational element. This is especially important in those records where only the part of the broader element appears.

Each visitation record can therefore contain potentially identifying informational elements that can be matched with known identifying characteristics or portions of characteristics of a particular individual, and thus lead to attribution of that record to that individual, and along with it the activity information in that record for later analysis.

For example, an originally unattributed visitation cookie record could contain an informational element "abe@whitehouse.gov". This element would be categorized as an "email address" element type. If that element matches the email address characteristic of a known individual, then that visitation record could be attributed with that known individual.

Of course the matching of a known individual's characteristic with the element of an anonymous visitation record may not be determinative, but rather provide a higher level of confidence in the attribution of that record to that individual. In other words, attribution may occur with less than 100% confidence as will be described below.

The degree to which an informational element within a visitation record is indicative of the particular individual can be quantified be means of an element confidence level. A confidence level of 100% means that element is without a doubt attributable to a given individual. Conversely, a 0% confidence level would mean that the element was without a doubt not attributable to that individual. Typically, most confidence levels will fall somewhere between 0 and 100 percent.

Some element types carry greater identifying potential than others, and thus can be potentially more indicative of a particular individual than others. For example, a specific zip code characteristic can be shared by many individuals. Therefore, the zip code element type can be given a correspondingly low identifying confidence level. An email address on the other hand, is often considered to be of particular importance in identifying a consumer and thus the email address element type can have a much higher element type confidence level.

Figure 3:
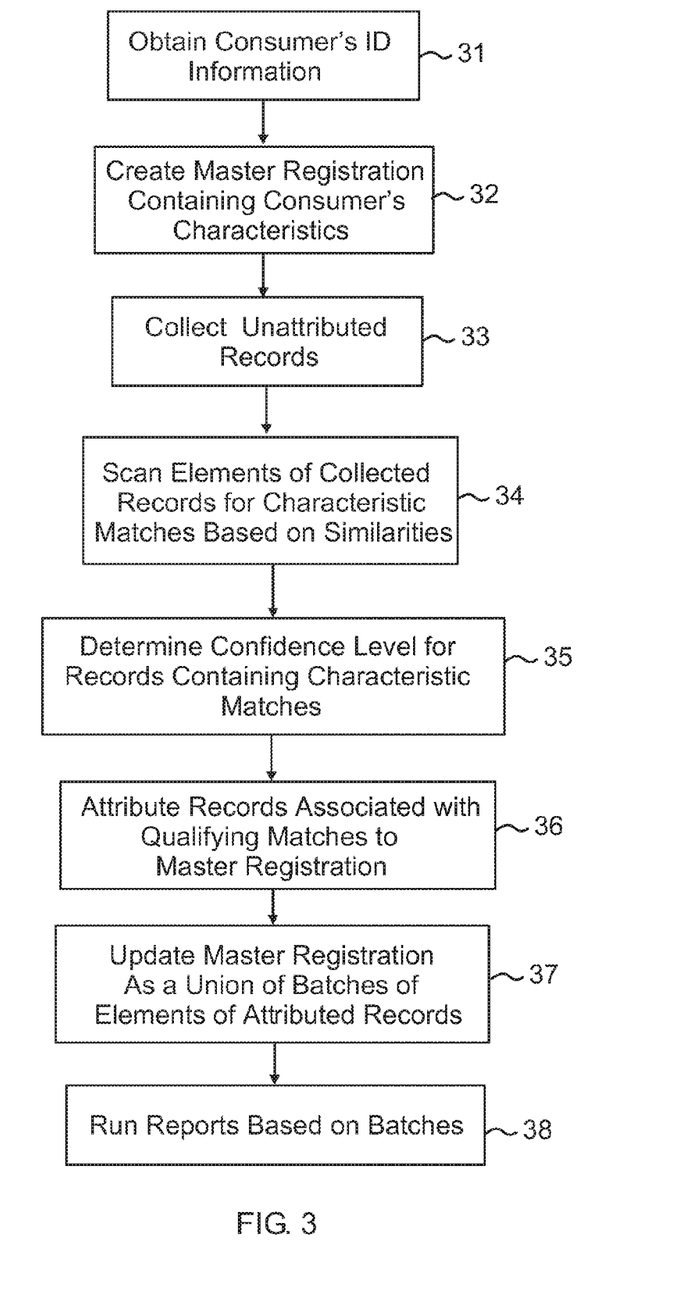
FIG. 3 is a flow diagram of a first exemplary visitation record analysis and attribution process.
Figure 4:
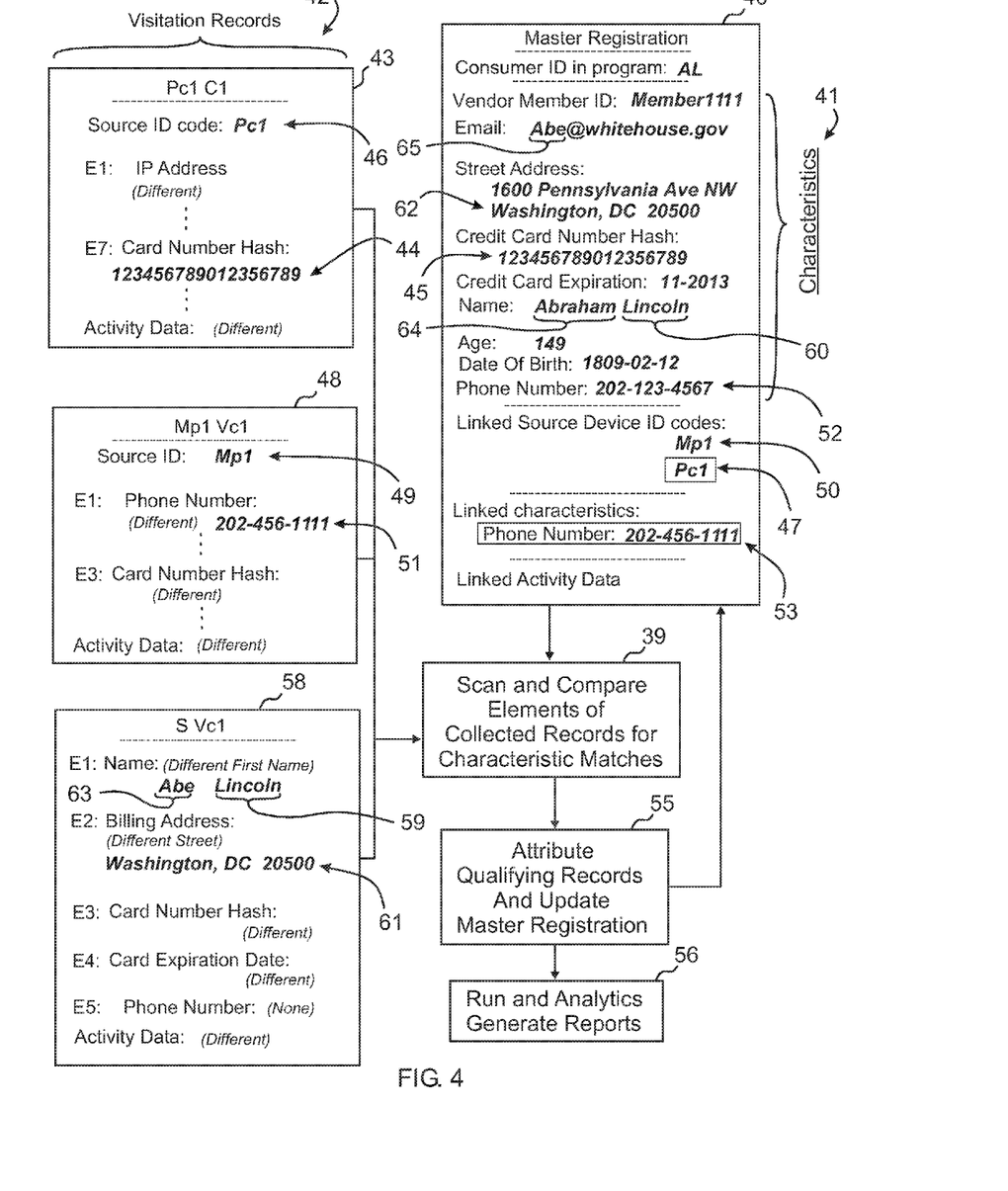
FIG. 4 is a block diagram of an exemplary scanning and attribution routine.

A first type of record attribution processing program is described below as illustrated by FIGS. 3 and 4. The program helps track the behavior of a known, identified individual by attributing otherwise unattributed and often anonymous data with that known individual.

The program process begins with obtaining information 31 regarding the identity of a consumer from either an on-line identification form with a vendor such as a membership sign-up sheet, or from some other clear and complete identification entered by the consumer. From this information a master registration file is created 32 having the identity of the consumer associated with a number of characteristics 41 about that consumer. The master registration and the characteristics contained within it are consequently of a high level of confidence.

As shown in FIG. 4, the master registration 40 contains an identification string for this particular consumer, namely AL, which is unique to the program, and one or more characteristics 41 each of which can typically be categorized to have a corresponding element type. For example, the characteristic "abe@whitehouse.gov" corresponds to the "email address" element type. It should be noted that the characteristics contained withing the master registration can include other data collected contemporaneously with the identity information. Thus, related and clearly identified elements of data evidencing that consumer's status or behavior can be stored in the master registration 40 at the time it is created 32. It can therefore be said that the master registration contains data related to tracked characteristics of the consumer.

Because the created registration can have the highest confidence, each characteristic contained in the master registration can have an appropriately high confidence. As shown in FIG. 3, a next step in the record attribution program involves a number of unattributed and potentially anonymous visitation records being collected 33 from various sources accessible to the program. The records can be supplied by a number of different cybernetic sources including, but not limited to: cookies originating from visits to the vendor's website by other computers; the vendor's received email records; mobile phone records from vendor's mobile phone answering service, and, credit/debit transaction records from the vendor's brick and mortar store. These unattributed visitation records can be supplied by sources under the control of the vendor, sources which are publically or privately accessible such as personal identity information databases, or databases maintained by the operator of the program, to name a few. The collected records can be inserted into a database maintained by the program operator as they are detected on a cybernetic network such as the Web.

The contents of the collected record database are periodically scanned 34 and combed to detect and flag certain elements that match or otherwise contain similarities to characteristics found in a particular master registration. Flagged elements can therefore be elements which are non-exclusively but potentially attributable to the identified consumer's master registration. The scan can be done for each master registration on file.

The scan can be conducted for a subset of element types having the highest confidence. Because element types such as credit card hashes, email addresses and mobile phone numbers have very high intrinsic confidence levels, the characteristics associated with these element types contained in the master registration are prime candidates for utilization in comparisons with the content of collected unattributed records.

For each record containing at least one flagged element a determination is made 35 regarding the confidence level which that record can be attributed to the master registration. The determination can be based on element type confidence levels described below. Therefore, part of the determination step can include assigning an element type to a given flagged element wherein that assigned element type has a confidence level. The determination can be a function of the similarities between the record and the master registration. If that confidence level is high enough, the record qualifies to be attributed 36 to the master registration including its contained elements and activity data. Thus, the elements contained in those attributed records are batched together to update the master registration 37. Elements within the batches can be attributed using a pairing routine which can adjust the confidence level of any given element. Those elements having a confidence level below a certain selected threshold may not be utilized in later analytics or scans. That threshold can be changed by the operator of the program.

Web analytic reports of consumer behavior can then be generated 38 based on the activities associated with the master registration at a given range of confidence. For example, vendor can run an analysis for all attributed records having a confidence level greater than a specified percentage.

The attribution of unattributed records can be done in the following way. Referring now to FIG. 4, in general the contents of a number of visitation records 42 are scanned and compared 39 against the contents of a master registration 40. Qualifying records are attributed to the master registration and the contents and links to the master registration can be updated 55. From the updated master record and associated records, consumer activity analyses can be run and reports generated according to selectable confidence ranges 56. This is an example of a pairing routine.

During a first scan, a visitation record Pc1 C1 43 is found having an informational element 44 corresponding to a credit card hash number 1234567890123456789. This informational element is found to be identical to the entirety of the credit card number hash value 45 loaded as a characteristic in the master registration 40. Because the credit card hash number is essentially unique, this element type has a very high confidence level. Thus, this match is of such a high confidence level that the record 43 can be attributed to consumer AL with the highest confidence. When a visitation record contains an element matching a characteristic of such high confidence, it can be said that a matching of the first order has been achieved for record attribution purposes.

In addition, because record Pc1 C1 43 is a desktop computer cookie, it typically contains a source identifier code 46 associated with that particular computer. In the present example the consumer's home desktop personal computer has the unique source identifier code Pc1 for ease of reference. In practice, that code could typically be a string containing an IP address and a date and time among other information. The master registration is updated to include a link to this source identifier code 47 for later use as a linked characteristic to be used in the subsequent scanning of other visitation records. In this way, other visitation records detected in the future having that same source identifier can be attributed to consumer AL with relatively high confidence. In FIG. 4, the newly added linked source identifier code 47 is shown in a box to set it apart from the data originally appearing in the master registration.

Thus, the master registration contains or is updated to contain a number of identification codes or links to identification codes for various source devices associated with that particular consumer for later pairing with corresponding codes in other unattributed visitation records.

A second visitation record Mp1 Vc1 48 is a mobile phone application ("app") virtual cookie. This record contains a source identifier code 49 for a particular mobile phone, namely mp1 that has been previously linked 50 to the master registration 40 for consumer AL. It should be noted that the phone number 51 in the record is different from the phone number 52 already contained in the master registration as a characteristic. However, because the phone number 51 in the record is an additional high confidence level element, that value can be added as a linked characteristic 53 to the master registration. Again this linked characteristic value is shown a box to set it apart from the data originally appearing in the master registration.

When a visitation record contains an element matching a linked characteristic of high confidence, such as a source device identifier code, it can be said that a matching of the second order has been achieved for record attribution purposes.

Other informational elements in an unattributed record having a lesser inherent confidence level can be useful in ultimately attributing that record to a consumer having a master registration on file as will be described below.

It should be noted that combinations of two or more elements within a single visitation record can create a corresponding increase in the confidence level of other elements. Thus if two elements in a single visitation record are matched with the corresponding characteristics of a known individual, then that record can be attributed to that individual with a higher confidence level than if only one element were matched.

Choosing the confidence level for a particular element type involves evaluating many factors such as what type of record the element type is taken from, the context with which that record is created, the required veracity of the individual inputting the information contained in that record, whether the individual can manipulate the content of the element, and the reliability of the system creating the record, among others. An example of an element type which is typically beyond manipulation by the individual is an IP Address.

It should be noted that element types can be subdivided based on the type of record they are associated with, and the expected confidence level that record type brings. In other words, for example, the record generated by an individual filling out an online form during a sale involving a credit card can be considered to result in a much higher intrinsic confidence level for its contained element types than a similar form filled out without a credit card transaction. Of these two record types, the email address contained in the sale-generated record would have higher intrinsic confidence than the non-sale record. Therefore, there can be two element types, namely "email address (sale)" and "email address (non-sale)", which would have different chosen intrinsic confidence levels.

Similarly, it should be noted that when a particular record contains an element having a very high confidence level, other elements contained within the same record can be assigned a correspondingly higher confidence level. Thus it is possible for the confidence level for a particular element type to change depending on the context of the record. Such adjustment can occur thorough use of a number of context adjustment weighting factors.

Both of the above are examples of contextual adjustment of confidence level. Adjustment can occur by applying one or more context weighting factors assigned to that particular context.

It should be noted that some element types may have a variable intrinsic confidence level. For example, the surname of a person can have lesser confidence when it is a common one like "Lincoln" and a greater confidence when it is a less common one like "Townshend". Thus an informational element categorized as a surname may be subject to an analysis of the commonality of that surname before a final intrinsic confidence level is assigned. Such an analysis can be accomplished by accessing for example the white page listings for the city and zip code contained in the record and determining the frequency of occurrence of the surname. Weighting factors based on the value of an element can be referred to as value weighting factors.

In many settings, however, it can be difficult to determine how a particular record was created. In such situations it is possible to essentially ignore the origin of a record and merely establish some basic intrinsic element confidence levels for the identifiable element types within the record. The term "intrinsic confidence level" is thus meant to refer to the confidence level of that element taken apart from the record context.

As shown in Table 1, by way of example, various element types are listed along with their chosen intrinsic element confidence levels. As stated previously, portions of some element types can act as element types in their own right such as the beginning strings of email addresses.

TABLE 1

Chosen Intrinsic Confidence Levels for Various Element Types

| Element Type | Intrinsic Confidence Factor |
|---|---|
| source ID: | 99% |
| email address: | 95% |
| starting string: | 65% |
| phone number: | 95% |
| street address: | 90% |

TABLE 1-continued

Chosen Intrinsic Confidence Levels for Various Element Types

| Element Type | Intrinsic Confidence Factor |
| --- | --- |
| city and zip: | 10% |
| credit card hash: | 99% |
| credit card expiration: | 40% |
| membership ID number: | 99% |
| name: | 90% |
| first name: | 5% |
| surname: | variable 5% to 25% |
| age: | 15% |
| date of birth: | 30% |
| IP address: | 75% |
| hours of use: | 10% |
| page access pattern: | 15% |

In should be noted that some informational elements of one type may match characteristics of another type. For example, the email starting string can match the first name characteristic, and vis versa. This type of match will typically have a lesser confidence level than a match among an element and characteristic of the same type. Therefore, matches between different element and characteristic types can result in an adjustment of the confidence level using adjustment weighting factor similar to the context adjustment weighting factor described above.

As shown in FIG. 4, a third visitation record S Vc1 58 is a credit card transaction virtual cookie maintained by the vendor. This record contains a number of informational elements, most of which do not match any master registration characteristics 41 nor any linked characteristics and are thus denoted to be "(Different)" shown in non-bold italics in the drawing. Some elements however do match some characteristics, and the elements are flagged. Specifically, the surname in the record 59, namely Lincoln, matches the surname 60 in the master registration. Because "Lincoln" is a common surname the confidence level for this match is assigned a level of 5%. The city and zip portion 61 of the billing address in the record matches the city and zip portion 62 of the street address of the master registration. A confidence level for this match is 10% according to Table 1.

Lastly, it is noted that the first name 63 of the visitation record "Abe" is different from the first name 64 of the name field "Abraham" in the master registration, and thus no match is found. However, when a scan is expanded to find matches across different element and characteristic types, a match is found between the first name 63 in the record and the beginning string 65 of the email address characteristic in the master registration. From the confidence level values entered in Table 1, a matching beginning string would be assigned 65%, whereas a matching first name would be assigned 5%. In this example, one way of assigning a confidence level to this cross-type match would be to assign the mean of the two values, or 35% (The mean of 5% and 65% being 35%).

The confidence level for a record can be determined by adding together the intrinsic confidence levels of the element types of the flagged elements. If the levels add up to more than 99%, the confidence level of the record is reduced to 99%. In this example the confidence levels for each of the flagged elements are simply added together (5%+10%+35%) for an aggregate confidence level for the record of 50%.

It should be noted that a final weighting factor or confidence level adjustment based on the number of flagged elements can also be applied. This would be useful to increase the confidence level in the above example because three elements were flagged. One type of adjustment would be adding 5%, for example, to the aggregate confidence level for every flagged element over one. Thus, in this example, the adjustment would be +10% (5% for the second flagged element plus 5% for the third flagged element) resulting in a final aggregate confidence level of 60%.

It shall be understood that the confidence level for a record can be calculated from the flagged elements according to many different formulae according various weighting factors and adjustments as desired.

When a visitation record contains two or more elements matching a characteristic or linked characteristic of lower confidence, it can be said that a matching of the third order has been achieved for record attribution purposes.

When a visitation record contains an element of a first type matching a characteristic or linked characteristic of a second different type, it can be said that a matching of the fourth order has been achieved for record attribution purposes. In the above example both third and fourth order matches occurred.

It shall be understood that a given record can be attributed to more than one known consumer when contained elements are so matched.

Figure 5:
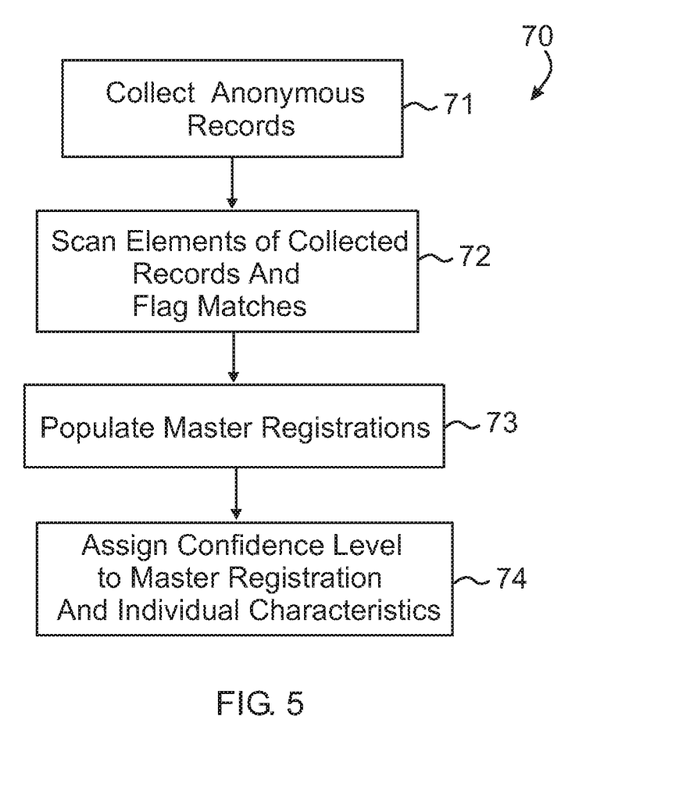
FIG. 5 is a flow diagram of a second exemplary anonymous visitation record analysis and attribution process.

A second type of record processing program 70 illustrated by FIG. 5 is used where no identification form has been completed by the consumer and no other form of positive identification is available. This program tries to generate individual master registrations from the collected data. In such a case, all elements of collected data obtained from a large number of consumers are scanned in order to recognize patterns of recurring potentially identifying characteristics which are then extracted and combined according to their similarities in order to generate/update a master registration for a unique, though not necessarily identified consumer. Each master registration can have an associated confidence level and yet remain un-associated with an identified consumer.

Similarly to the first record processing program described above, a number of potentially anonymous visitation records are collected 71 from various sources accessible to the program.

In an initial analysis, the collected records are scanned 72 to find and flag those elements that relate to a potentially unique consumer identity characteristics. Of particular interest are element types having a high intrinsic confidence level such as email addresses, phone numbers, mailing addresses, credit card number hash values, and unique source identifier codes, to name a few.

Each of the flagged records is then used to populate one or more program-generated master registrations 73. In other words, each of the elements from a record having a flagged element for which an element type can be discerned is loaded into the master registration as a characteristic. The master registration is also given an initial confidence level based on the weighting factors described in the previous program. Each of the loaded characteristics can also be given a confidence level based on intrinsic element types, context weighting factors and value weighting factors.

Once the master registration has been created it can be updated similarly to the program of the first type described above. The combined characteristics in and linked to the master registration are then used to compare and attribute the related elements of information from other records to a single consumer using a pairing routine. That consumer can be identified depending on the type and confidence level of the information found in the combined elements.

For those records in which the contained elements do not indicate a unique consumer identity and which cannot otherwise be attributed to an existing master registration, further processing is undertaken to create additional master registrations. This processing can include comparing those element types which relate to a potentially non-unique consumer identity such as credit card expiration dates, membership ID numbers, personal names, ages, birth dates of a lesser confidence.

The union of attributed records in one master registration file ostensibly ties the activities in those records to a putative consumer.

It is possible that a non-anonymous record (i.e. one that it attributed to a known consumer) provides anonymous informational elements which can be attributed to a different consumer such as when a husband and wife use the same computer and a single cookie is updated with two separate visitations.

Further, it is possible that various anonymous elements can be derived from non-visitation record sources such as a databases of mailing addresses or other records. The program can be adapted to screen for and process these elements.

Figure 6:
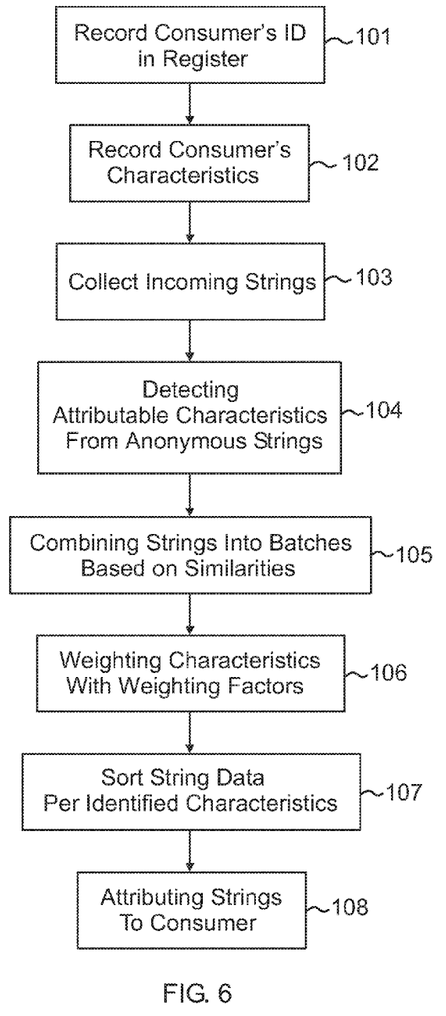
FIG. 6 is a flow diagram of a third exemplary anonymous visitation record analysis and attribution process.

In a third type of record processing program illustrated by FIG. 6, the elements and characteristics are referred to as strings of data. The process begins with recording 101 in a first register the identity of a consumer derived from either an on-line membership application with a supplier or from some other clear and complete identification entered by the consumer. Related and clearly identified strings of data evidencing that customer status or behavior are stored 102 in the register. Incoming anonymous strings of information are collected 103 in a database as they are detected on the Web.

The contents of the database are periodically scanned 104 to detect and flag recurring characteristics such as an email address, internet protocol (IP) address, page access pattern, age, address, or hours of use that are non-exclusively but potentially attributable to the identified consumer. The detected characteristics are combined 105 into batches as a function of their similarities. Each one of these recurring characteristics in each batch is weighted 16 by a weighting factor according to its confidence level and stored under the identification of the customer. The weighting factors indicate the weight to be given to each characteristic and the priority to be assigned to it. As an example some of the preferred weighting factors are:

| | |
|---|---|
| Email Address | 95% |
| Phone Number or Street Address | 90% |
| Name and Zip Code | 80% |
| Name and Age | 70% |
| IP Address | 50% |
| Product Access Patterns | 30% |
| Page Access Patterns | 20% |

Portions of characteristics may have weighting factors similarly assigned. Those weighting factors should lower the confidence of a non-entire portion of a characteristic compared to the confidence of the entire characteristic. In other words, for example, the weighting factor assigned to an email starting string should result in a lower confidence than for the entire email address.

All strings of data that are collected are run through a sorting routine 107 that uses the stored recurring characteristics to identify their sources. The batches and related strings of information are attributed 108 through analysis to identified consumers using a pairing routine which seeks to match up strings or parts of strings with recurring parts of strings associated with the identified consumers.

Figure 7:
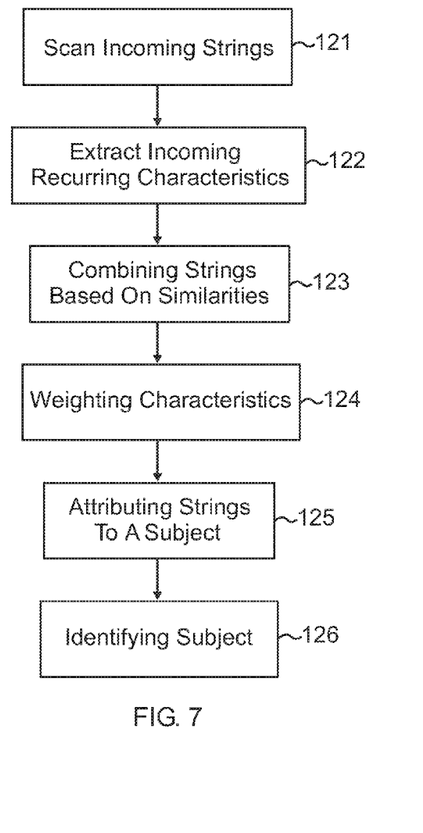
FIG. 7 is a flow diagram of a fourth exemplary anonymous visitation record analysis and attribution process.

A fourth type of record processing program illustrated by FIG. 7 is used where no registration by customer has taken place and no other form of positive identification is available. In such a case, all strings of collected data obtained from a large number of consumers are scanned 121 in order to recognize patterns of recurring characteristics which are then extracted 122 and combined 123 according to their similarities. As in the first type, each one of the characteristics is weighted 124 by a weighting factor. The combined and weighted characteristics are then used to attribute 125 the related strings of information to a single consumer using a pairing routine. That consumer is identified 126 according to information found in the combined strings.

While the exemplary embodiments of the invention have been described, modifications can be made and other embodiments may be devised without departing from the spirit of the invention and the scope of the appended claims.

What is claimed is:

1. A process for associating unattributed elements of information collected from a plurality of cybernetic sources with a plurality of consumers, said process comprising:
   obtaining information regarding identity of a first consumer from the plurality of cybernetric sources;
   creating a master registration containing at least one characteristic attributed to the first consumer;
   collecting a plurality of visitation records containing elements of information non-exclusively attributable to said first consumer;
   detecting in said elements a value matching portion of said at least one characteristic by periodically scanning the collected visitation records, wherein said value originating in a first of said records; and
   attributing, by a processor, said first of said records to said first consumer.

2. The process of claim 1, wherein said records are collected through a plurality of disparate marketing channels.

3. The process of claim 1, which further comprises assigning a record confidence level to said first of said records.

4. The process of claim 3, which further comprises: each of said records comprising activity data related to a cybernetic visit; a plurality of said records being attributed to a plurality of master registrations; and, running an analysis of said activity data across said plurality of registrations and said plurality of records.

5. The process of claim 1, wherein said running comprises selecting a minimum confidence level; and screening said plurality of said record confidence levels against said minimum confidence level.

6. The process of claim 1, which further comprises assigning a master registration confidence level to said first master registration.

7. The process of claim 6, which further comprises adjusting said master registration confidence level according to a record confidence level said first of said records attributed to said first master registration.

8. The process of claim 6, which further comprises updating said record confidence level according to at least one weighting factor determined by the context in which said first of said records was created.

9. The process of claim 6, which further comprises updating said record confidence level according to a number of matching dements found within said first of said records.

10. The process of claim 9, wherein said updating comprises assigning an intrinsic confidence level to each of a plurality of element types common to said records.

11. The process of claim 10, which further comprises changing said intrinsic confidence level according a context adjustment weighting factor.

12. The process of claim 1, which further comprises linking said first master registration with a source identifier code associated with said first of said records.

13. The process of claim 12, which further comprises subsequent detecting of a second value in a second of said records matching said source identifier code.

14. The process of claim 1, which further comprises said portion of said characteristic being an entirety of said characteristic.

15. The process of claim 1, wherein said value is of a first type and said at least one characteristic is of a second type, wherein said first and second types are different.

16. The process of claim 1, which further comprises: flagging a number of elements associated with said value; determining whether said number of elements has an associated confidence level which allows said value to be used as a future characteristic in said master registration; and, updating said master registration to have a new characteristic containing said value.

17. The process of claim 1, wherein said first master registration remain un-associated with an identified one of said consumers.

18. The process of claim 1, which further comprises assigning a weighting factor to said characteristic.

19. A process for associating anonymous strings of information collected from a plurality of cybernetic sources with identified consumers, said process comprising:

detecting in said strings characteristic values non-exclusively attributable to a consumer; flagging strings containing a plurality of said characteristics;

combining a plurality of said flagged strings into batches as a function of similarities in said characteristics; and attributing, by a processor, each of said batches and related strings of information to a single one of said consumers as a function of information in said batches using a pairing routine which seeks to match up strings or parts of strings with recurring parts of strings associated with the single one of said consumers.

20. A process for associating strings of information collected from a plurality of cybernetic sources with a subject, said process comprising:

extracting from each of said strings at least one characteristic non-exclusively attributable to a subject;

combining a plurality of said strings into batches as a function of similarities in said respective characteristics;

weighting each one of said characteristics by a weighting factor;

attributing each of said batches to a subject using said combined and weighted characteristics; and identifying, by a processor, said subject through information contained in said attributed batches.

21. The process of claim 20, wherein said combining comprises scanning said strings to extract at least one common characteristic.

22. The process of claim 21, wherein said scanning comprises using a pairing routine.

* * * * *